(12) United States Patent
Reynolds (10) Patent No.: US 6,587,879 B1
(45) Date of Patent: Jul. 1, 2003

(54) ARCHITECTURE FOR TESTING PERVASIVE APPLIANCES

(75) Inventor: Michael Joseph Reynolds, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,692

(22) Filed: Nov. 18, 1999

(51) Int. Cl.[7] ..................... G06F 15/173; G05B 11/01; H02H 3/05
(52) U.S. Cl. ............................ 709/224; 700/26; 714/30; 714/31; 714/738
(58) Field of Search ............................ 714/30–31, 37, 714/40–41, 738; 709/223–224; 399/9–37; 700/26

(56) References Cited

U.S. PATENT DOCUMENTS

| | | | | |
|---|---|---|---|---|
| 4,628,443 A | * | 12/1986 | Rickard et al. ............... | 700/79 |
| 5,233,611 A | * | 8/1993 | Triantafyllos et al. ........ | 714/46 |
| 5,306,995 A | * | 4/1994 | Payne et al. ................. | 318/561 |
| 5,491,791 A | * | 2/1996 | Glowny et al. ............... | 714/26 |
| 5,513,314 A | * | 4/1996 | Kandasamy et al. ........... | 714/6 |
| 5,655,081 A | * | 8/1997 | Bonnell et al. .............. | 709/202 |
| 5,854,889 A | * | 12/1998 | Liese et al. ................. | 714/32 |
| 5,875,430 A | * | 2/1999 | Koether ....................... | 705/1 |
| 5,905,648 A | * | 5/1999 | Badami ........................ | 700/55 |
| 6,058,434 A | * | 5/2000 | Wilt et al. .................. | 709/217 |
| 6,121,593 A | * | 9/2000 | Mansbery et al. ........... | 219/679 |
| 6,279,123 B1 | * | 8/2001 | Mulrooney ................... | 703/20 |
| 6,279,124 B1 | * | 8/2001 | Brouwer et al. ............. | 709/328 |

OTHER PUBLICATIONS

W. David Pitt, "How Do I Use Servlets?", Dr. Dobb's Journal, Dec. 1998, pp. 122–125.*

S. McPherson "Java Servlets and Serialization with RMI", Java Developer Connection, <java.sun.com>, Oct. 1999, pp. 1–14.*
G. Voss, "JavaServer Technologies, Part I", Java Developer Connection, java.sun.com, Apr. 1997, pp. 1–14.
G. Voss, "JavaServer™ Technologies, Part II", Java Developer Connection, java.sun.com, May 1997, pp. 1–28.
P.I. Chang, "Inside the Java Web Server", java.sun.com, Aug. 1997, pp. 1–10.
"The Java™ Servlet API", java.sun.com, 1995, pp. 1–16.
Hob Wubbena, abstract for "Web Enablement of Test & Measurement Applications", NEPCON West 98, p. 1372.
J. Jilg, et al., "Java Servlets: Advantages and Deployment", e–Business Advisor, Jul. 1998, pp. 32–35.

* cited by examiner

*Primary Examiner*—David Wiley
*Assistant Examiner*—George Neurauter
(74) *Attorney, Agent, or Firm*—David W. Victor; Konrad Raynes Victor & Mann LLP

(57) ABSTRACT

Disclosed is a system, method, and program for testing appliances. The appliance includes an embedded processor and an appliance network address to communicate with remote systems over a network. A first server program having a first network address, such as an HTTP server program, receives a test request indicating a test to perform and an appliance to test. A second server program, such as a Java servlet, having a second network address is loaded and transmits information on the test request to the appliance network address indicated in the test request. A third server program having a third network address, such as a Java servlet, is loaded to execute within the appliance embedded processor in response to receiving information on the test request. The second server program transmits at least one test command to the third network address. The third server program executes each test command transmitted from the second server program and returns test response data, generated in response executing each test command, to the second network address for processing by the second server program.

43 Claims, 5 Drawing Sheets

ARCHITECTURE FOR TESTING PERVASIVE APPLIANCES

BACKGROUND OF THE INVENTION

1. Field of the Invention

The present invention relates to an architecture for testing pervasive appliances and, in particular, testing pervasive appliances by downloading a program to the appliance to establish communication with a remote site over a network to conduct the testing operations.

2. Description of the Related Art

Currently, to diagnose pervasive appliances, such as common household appliances and other electronic devices, the owner must physically transfer via airborne mail or self-delivery the device to a service center to test and diagnose the device. Alternatively, a service representative may visit the owner to test the device. Such types of diagnosis are costly to the service provider and the customer if the operational problems may otherwise be readily solved and diagnosed at the consumer locale where the device is located.

Complex computer systems include capabilities to diagnose and test other computers from a remote site over a network. However, such systems often require substantial computational resources and are not feasible for pervasive appliances and other electronic devices that have limited computational capabilities.

To address these issues, the computer industry is currently working to develop open standards for test and measurement systems to allow the testing of a wide variety of devices. The goal of these efforts is to reduce the costs and complexity of connecting test equipment to computers and intranets. One proposed test and measurement standard is the IVI Foundation's "Interchangeable Virtual Instruments," which is a proposed test and measurement instrument driver standard that builds on the VXI Plug&Play specifications. This specification discusses a standard driver interface to be used across devices to allow testing across computer networks.

Some of the difficulties in developing a common interface and testing architecture for pervasive appliances include the wide variety of functions and components within different appliances and the limited computational capabilities of many appliances.

Thus, there is a need in the art for architecture standards for testing remote devices having limited processing capabilities, such as consumer appliances and other types of electronic devices, over a computer network.

SUMMARY OF THE PREFERRED EMBODIMENTS

Preferred embodiments disclose a system, method, and program for testing appliances. The appliance includes an embedded processor system and an appliance network address to communicate with remote systems over a network. A first server program having a first network address receives a test request indicating a test to perform and an appliance to test. A second server program having a second network address is loaded and transmits information on the test request to the appliance network address indicated in the test request. A third server program having a third network address is loaded to execute within the appliance embedded processor in response to receiving information on the test request. The second server program transmits at least one test command to the third network address. The third server program executes each test command transmitted from the second server program and returns test response data, generated in response to executing each test command, to the second network address for processing by the second server program.

In further embodiments, a fourth server program executing within the appliance embedded processor receives the information on the test request transmitted by the second server program. A determination is made as to whether the third server program is loaded within the appliance embedded processor. The fourth server program sends a request for the third server program to the second network address if the third server program is not loaded in the appliance embedded processor. The fourth server program receives the third server program from the second server program.

In still further embodiments, the first server program is a Hypertext Transfer Protocol (HTTP) server, the second server program is a servlet, the third server program is a servlet, and the fourth server program is an HTTP server.

In certain embodiments, a computer connected to the network generates the test request and transmits the test request to the first server program at the first network address. The second server program returns test result data to the computer over the network.

Preferred embodiments provide a testing architecture to implement a servlet or other application program within an appliance having limited embedded processing capability. The testing architecture provides a framework in which test commands may be transmitted from a server to the servlet executing in the appliance embedded system in a manner that minimizes use of appliance computational resources and at the same time allows the server to cause the appliance to perform requested testing operations. Preferred embodiments further provide an integrated computing environment in which a test request is generated at one computer system and then transferred to the test server for automatic handling and routing to the subject appliance. In this way, the test server handles communication with the appliance on behalf of the operator generating the test request utilizing the servlet architecture of the preferred embodiments. The preferred test architecture allows for remote diagnose of pervasive appliances to allow for better support and troubleshooting of the appliances. As more and more electronic appliances utilize embedded microprocessor based systems, the preferred embodiment test architecture can be widely used to diagnose numerous classes of pervasive appliances.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
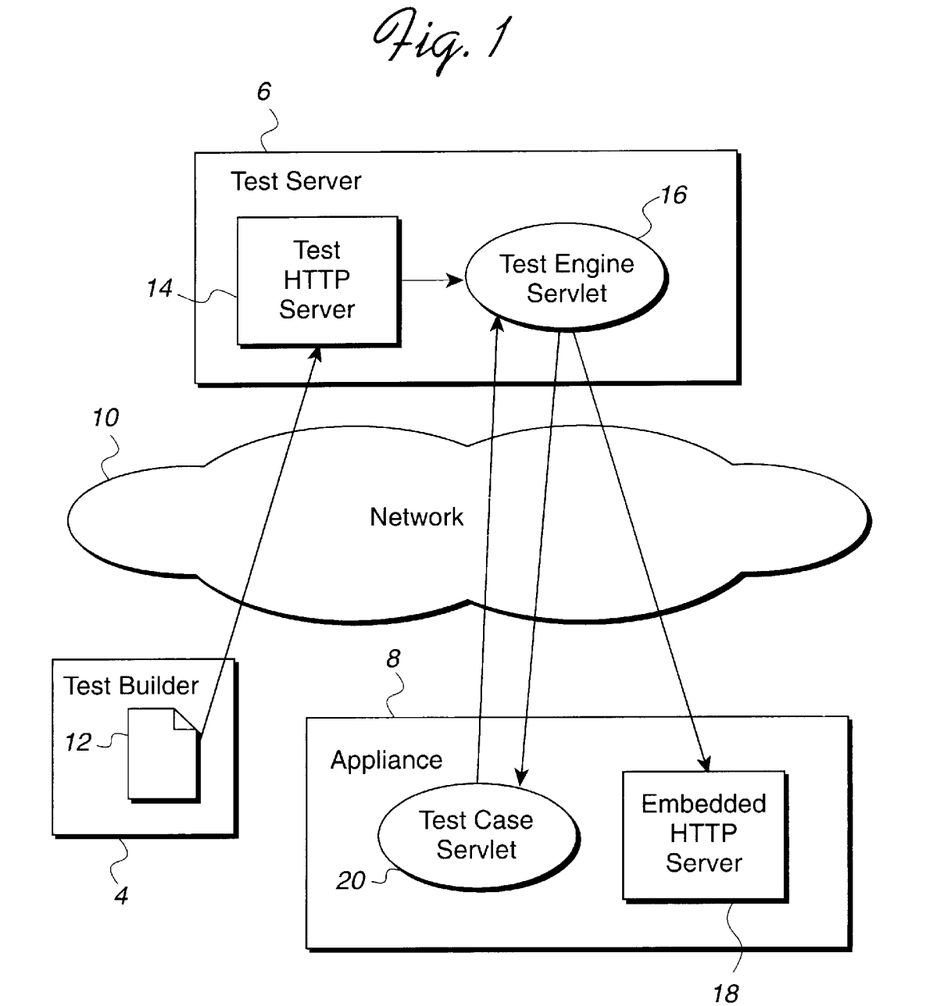
FIG. 1 illustrates a computing environment in which preferred embodiments in accordance with the present invention are implemented.
Figure 2:
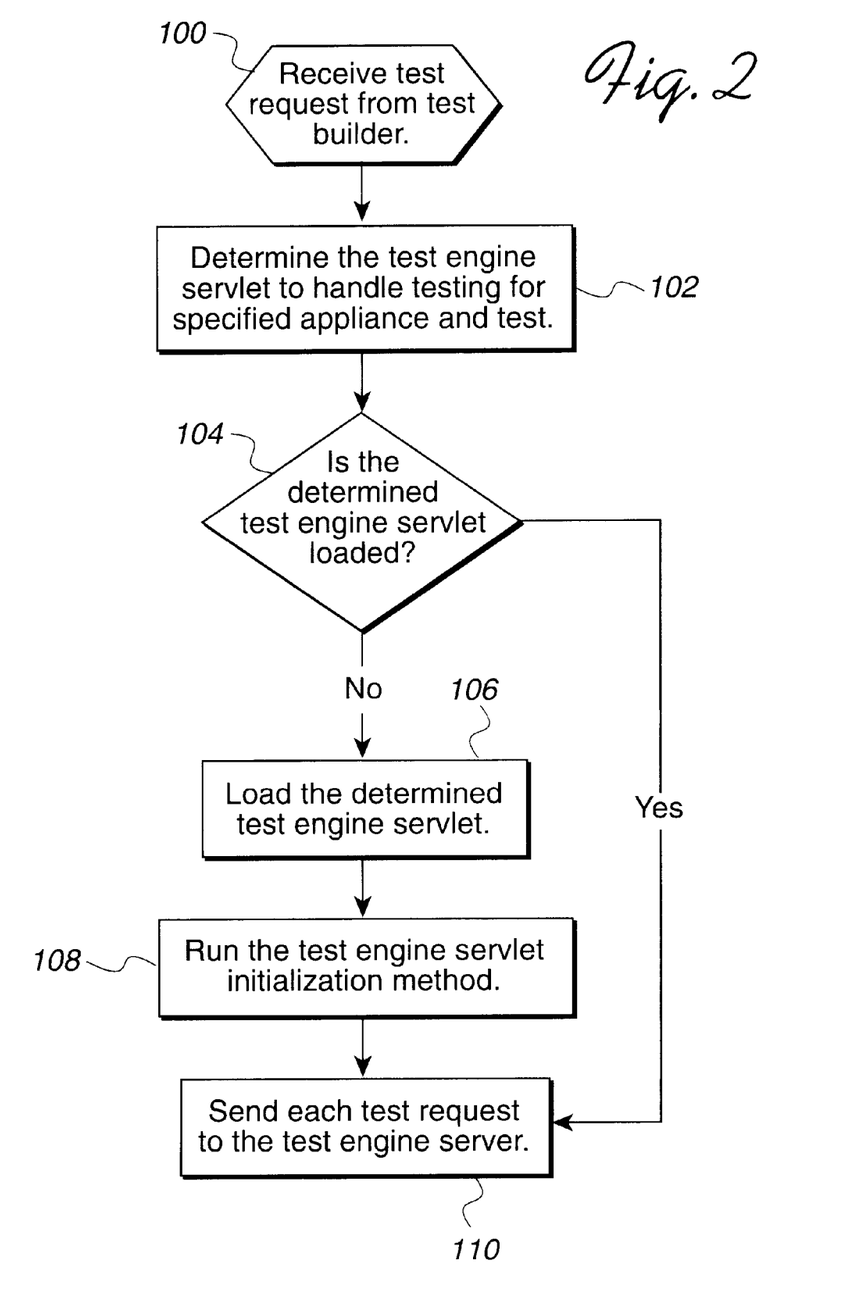
FIGS. 2–5 illustrate logic implemented within a test server and appliance embedded system to test the appliance in accordance with preferred embodiments of the present invention.

FIG. 1 illustrates a computing environment in which preferred embodiments are implemented. A test builder 4, test server 6, and appliance 8 comprise devices that communicate over a network 10. The test builder 4 is preferably a client computer at which a user would generate a test request form 12 using a graphical user interface (GUI) at the test builder 4. The test server 6 is preferably a server class computer particularly suited for concurrently processing multiple data input/output requests from different systems. The appliance 8 comprises a pervasive appliance, such as a consumer electronic device or any other electronic device with limited computational capabilities. In preferred embodiments, the appliance 8 includes an inexpensive microprocessor such that the electromechanical operations performed by the appliance are performed under microprocessor control using servo technology known in the art. The network 10 may be a TCP/IP network, such as the Internet and World Wide Web, or any other network system known in the art, e.g., LAN, Ethernet, WAN, System Area Network (SAN), Token Ring, etc. Alternatively, there may be separate and different networks between the test builder 4, test server 6, and appliance 8. All devices communicating on the network 10 would include a network address, such as an IP address.

The test server 6 includes a HyperText Transfer Protocol (HTTP) server 14 for processing requests from HTTP clients. The HTTP server protocol is described in "Hypertext Transfer Protocol—HTTP/1.1," Network Working Group, Request for Comments No. 2068 (January, 1997), which publication is incorporated herein by reference in its entirety. The test builder 4 would include an HTTP client, such as a Web browser, to communicate the test request 12 to the test HTTP server 14. In preferred embodiments, the test server 6 is a Java enabled machine capable of executing the test engine servlet 16, which in preferred embodiments is implemented as a Java Servlet.** The appliance 8 includes an embedded HTTP server 18 for handling HTTP requests and is Java enabled and capable of executing the test case servlet 20, which in preferred embodiments is a Java servlet.

**JAVA is a trademark of Sun Microsystems, Inc.

Because the appliance 8 has limited processing capabilities, the embedded HTTP server 18 includes a minimum amount of code that is necessary to perform only the required operations. The appliance 8 would further include an embedded Java operating system to process the test case servlet 20 that is especially designed for a limited capacity programmable processor, such as a real time operating system (RTOS) kernel to process Java commands. As discussed, in preferred embodiments, the test engine 16 and test case servlets 20 are implemented as Java servlets. Java Servlets are Java objects that are programs having classes that may be dynamically loaded, either across the network or from local storage, to add dynamic behavior to the system. Servlets are typically faceless objects (without graphical interface of their own) and have their own URL address. Once a servlet has been loaded and initialized, clients can directly invoke the servlet by entering a URL of the form:

http://server_host/servlet/<servlet name>/?arguments

In preferred embodiments, the test server 6 would include one or more test engines 16 and test case 20 servlets for each type of test and appliance. Each servlet will include the test code unique to the specific appliance, e.g., refrigerator, microwave, automobile, etc.

In preferred embodiments, a user at the test builder 4 would enter data in a test request form 12 specifying a name of the appliance 8 to be tested, which is preferably a logical name or alias of the IP address of the appliance. In preferred embodiments, the name is capable of being transformed to the corresponding IP address using global conversion configuration information. The name may specify an entire set of appliances to be tested. The test will further include a test name specifying a specific test to perform on the appliance. The test request may further include a test instruction that defines a specific sub-set of tests to perform. For instance, the test instruction could indicate to only perform date and time verification testing and not other tests included with the specified test case name. Test parameters may be included in the test request to specify values to use when testing.

Figure 3:
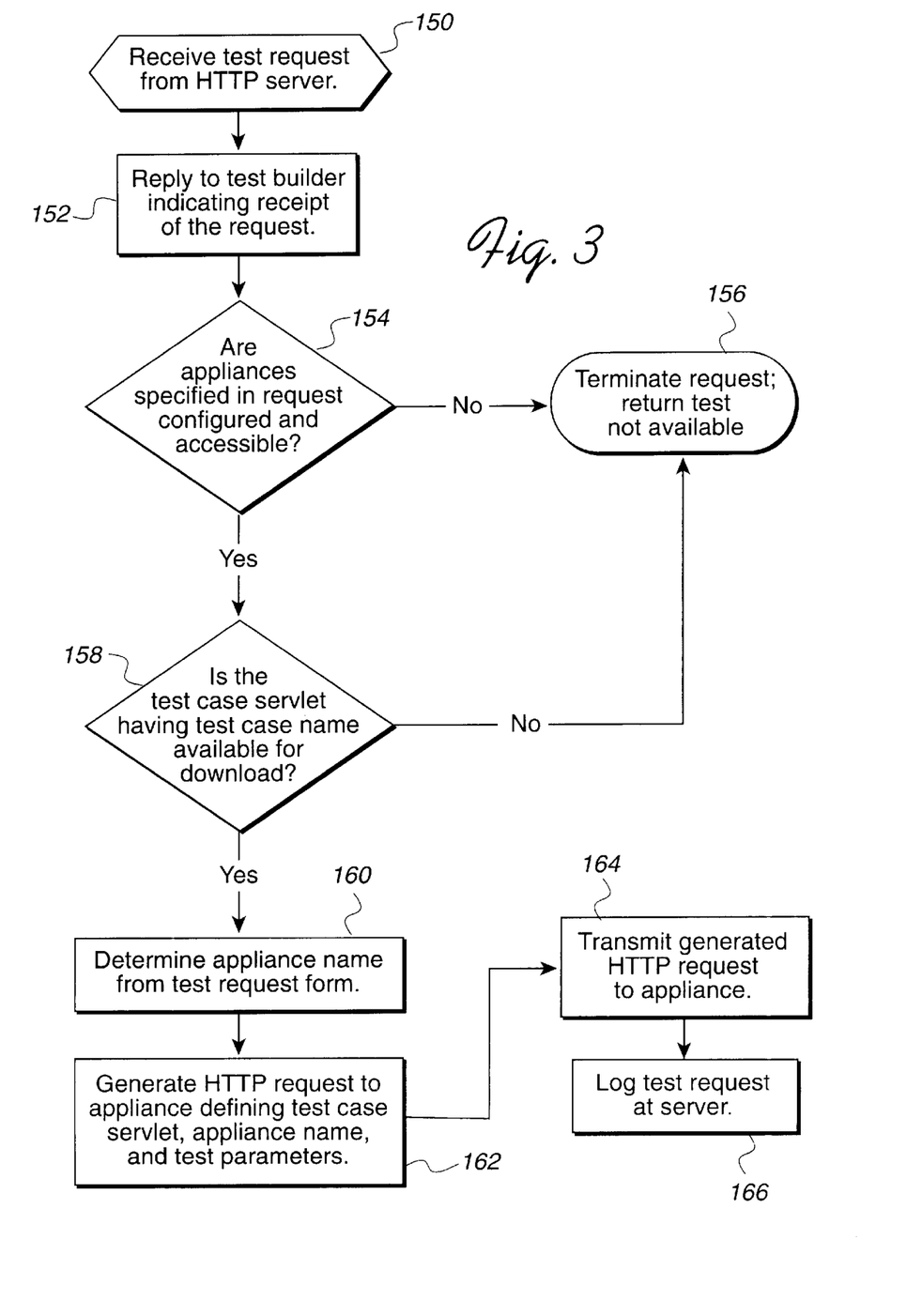

FIGS. 2–5 illustrate logic implemented in the HTTP server 14, test engine servlet 16, embedded HTTP server 18, and test case servlet 20, respectively, to implement the architecture for testing the pervasive appliance 8. With respect to FIG. 2, control begins at block 100 with the test HTTP server 14 receiving a test request 12 from the test builder 4. The HTTP server 14 determines (at block 102) the test engine servlet 16 to handle the testing for the appliance and test specified in the test request. The test server 6 may include a number of different test engine servlets for different appliances and tests. Further, a servlet 16 may use threading to perform different test operations. The HTTP server 14 determines (at block 104) whether the determined test engine servlet 16 is currently loaded in the test server 6. As discussed, a servlet remains on-line and available to receive requests and communications to its network address (URL). If the test engine servlet 16 is not loaded, then the HTTP server 14 would issue an HTTP GET request to load (at block 106) the determined test engine servlet 16 and then run (at block 108) the test engine servlet 16 initialization method. As part of the initialization, the test engine servlet 16 could access necessary test information from the test request, such as the pervasive appliance(s) subject to the test, name translation information, test case servlets to provide the appliance 8 as part of the test, and any name translation for the test case servlet, which has its own URL. After the test engine servlet 16 is loaded and initialized (from the yes branch of block 104 or block 108), the HTTP server 14 transmits the test request to the test engine servlet 16 With respect to FIG. 3, control begins at block 150 with the test engine servlet 16 receiving the test request from the HTTP server 14. The test engine servlet 16 indicates (at block 152) receipt of the test request to the test builder 4 that initiated the test. The test engine servlet 16 then determines (at block 154) whether the appliance(s) 8 to test are configured and accessible over the network 10. For instance, the test engine servlet 16 may ping the appliance 8 to see if it is accessible over the network and access configuration information from the appliance 8 to determine if the appliance 8 includes the appropriate resources and embedded Java support to perform the testing operations. If the appliance 8 is not configured properly nor accessible, then the request is terminated (at block 156) and a fail message may be logged on the test server 6. Otherwise, if the appliances 8 are accessible and properly configured, then the test engine servlet 16 further determines (at block 158) whether the test case servlet specified in the test request is available at the test server 6, or elsewhere, to transfer to the appliance 8. If not, then control transfers to block 156 to terminate the request with a different message. Otherwise, if the test case servlet is available, then the test engine servlet 16 determines (at block 160) the appliance 8 name from the test request form 12. The test engine servlet 16 generates (at block 162) an HTTP request to the determined appliance 8 defining the test case servlet, the appliance name, and test parameters. Request (1) below provides an example of the HTTP request from the test engine servlet 16 to the appliance 8.

http://Appliance1/servlet/getDate/?tci=2&tp=50     (1)

The parameter "Appliance1" is the appliance name, "get-Date" is the servlet name, "tci" is the test case instruction, and "tp" is the test parameter. The test case servlet 20 would use this parameter information to determine the test case server to access and control the test operations performed.

After constructing the HTTP request, the test engine servlet 16 transmits (at block 164) the generated HTTP request to the embedded HTTP server 18 in the appliance 8 and the test server 6 logs (at block 166) the test request sent to the appliance. Requests are logged to determine which appliances did not respond to requests.

Figure 4:
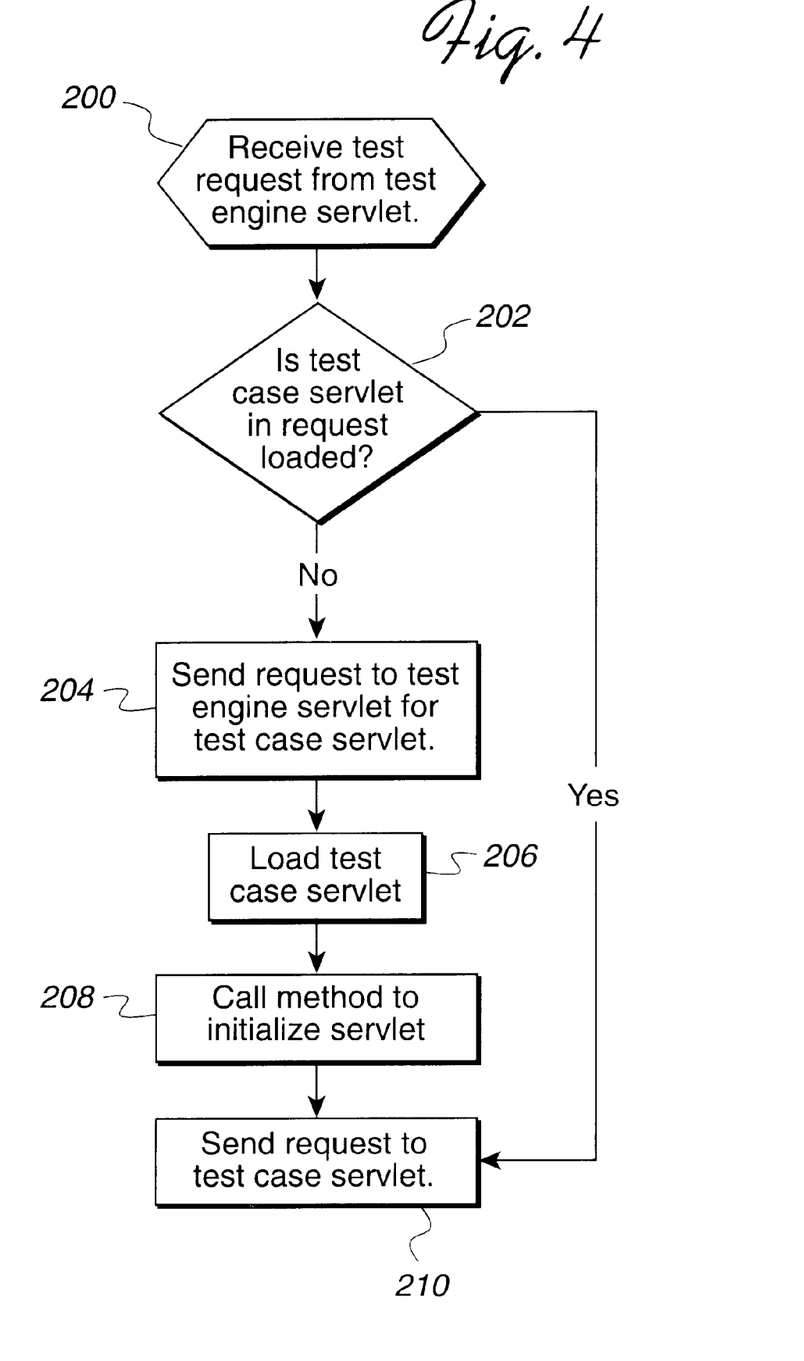

With respect to FIG. 4, control begins at block 200 with the embedded HTTP server 18, executing in the appliance 8 embedded processor, receiving the generated HTTP test request from the test engine servlet 16, indicating the name of the test case servlet and other parameters to use when executing the servlet. As discussed, this test information would be included in the HTTP request, such as the above HTTP request (1). The embedded HTTP server 18 determines (at block 202) whether the test case servlet 20 is loaded. If not, then the embedded HTTP server 18 sends (at block 204) a request to the test HTTP server 14 for the test case servlet 20. In preferred embodiments, the appliance 8 has limited memory resources. Thus, the test case servlet 20 is maintained on the test server 6. Upon receiving the test case servlet 20, the embedded HTTP server 18 loads (at block 206) the test case servlet 20 and calls (at block 208) a method to initialize the test case servlet 20. From the yes branch of block 202 or block 208, the embedded HTTP server 18 sends (at block 210) the request to the test case servlet 20.

Figure 5:
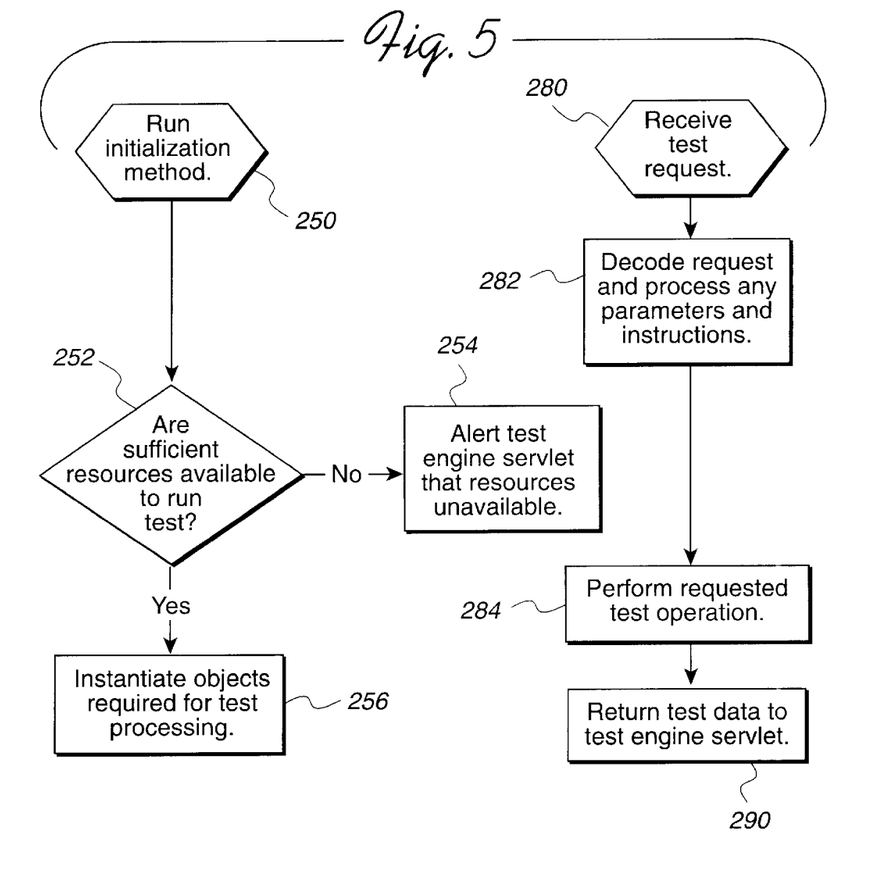

With respect to FIG. 5, control begins at block 250 with the test case servlet 20 running the initialization method and determining (at block 252) whether there are sufficient resources available in the appliance 8 to run the test. If there are not sufficient resources, then the test case servlet 20 alerts (at block 254) the test engine servlet 16 that resources are unavailable. Alternatively, the test case servlet 20 could alert the test engine servlet 16 on a request-by-request basis due to the possibility that resources may become available. Otherwise, if sufficient resources are available, then the test case servlet 20 instantiates (at block 256) any objects required for testing and performs any necessary setup operations.

At block 280, the test case servlet 20 receives a test request. The test case servlet 20 decodes (at block 282) the request and processes any parameters and instructions that control how the test is carried out. The requested test operation is then performed (at block 284) in accordance with any provided instructions and/or parameters. The test case servlet 20 returns (at block 290) test data to the test engine servlet 16.

To minimize the size of the test case servlet 20 and minimize use of appliance 8 memory resources, the test case servlet 20 may include only the initial test request or no test request. Instead, the test case servlet 20 includes enough code to initialize itself and maintain itself in an operational state to receive and process requests from the test engine servlet 16. In such case, most of the testing overhead remains with the test engine servlet 16. One goal is to design the test case servlets 20 to perform compact, specific tests without having to log or analyze the results. The test engine servlet 16 may then transmit a series of basic requests to the test case servlet 16 to perform specific operations and return the raw data. When receiving a reply from the test case servlet 20, the test engine servlet 16 would decode the reply and access the returned raw data to store or further process.

The log file would also be updated to indicate that a reply was received for the request. After receiving a reply, the test engine servlet 16 may transmit any further test commands; if there are such pending commands, to the test case servlet 20. If the appliance 8 has sufficient computational resources, then the test case servlet 20 executing therein may concurrently process multiple test operations from the test engine servlet 16. Alternatively, for appliance's 8 with more limited processing capabilities, the test engine server 16 may only serially transmit test commands to the test case servlet 20 and wait for data to be returned before transmitting the next command.

Moreover, if multiple appliances are tested, then the test engine servlet 16 would manage test operations and communicate with the same test case servlet 20 executing in the embedded system of each of the appliances being tested. There may be multiple test engine servlets 16, each managing the execution of one or more test case servlets 16 at one or more appliances. Further, each test engine servlet 16 may open multiple threads, using multi-threading techniques known in the art, to manage the concurrent execution of one or more test case servlets 20 for one or more appliances.

The test builder 12 may generate a destroy code and transmit a destroy code to the appliance 8 to have the test case servlet 20 remove itself from the appliance 8. In this way, an operator at the test builder 12 may selectively destroy the test case servlet 20.

Following are some testing operations that the test case servlet 20 may perform in response to test requests from the test engine servlet 16:

Appliance Accessibility Testing: The test case servlet 20 may test the availability and configuration of the appliance 8, such as accessing communication medium, connection software, and information on the embedded HTTP Server and Java support. This operation could be performed as part of initialization.

Application Program Interface or Package Testing: The simplest test would not require the test case servlet 20 to decode the request or process parameters. For instance, a request may only request a specific value or setting in the appliance, e.g., a request to determine the appliance 8 serial number. In response to the request, the test case servlet 20 executes the getSerialNumber method and returns the serial number to the test engine servlet 16. The request instructions and test parameters can be used for more complex application program interface or method testing. For instance, the instruction may specify a specific method to test when several versions of the same method are available in overloaded form. Additionally, the parameters may provide application program interface or method parameter values.

Appliance Component Testing: The test case servlet 20 may test the parts of the control system, such as the processor and Java enabled features and test the interaction of the system components. These tests may diagnose whether the test case servlet 20 executing in the appliance is providing the appropriate responses to system requests. One aspect of this test may involve testing the interaction of different components within the control system. For instance, such tests may test whether a failure is properly returned when an illegal operation (from a security standpoint) is attempted or to test the operation of output devices, such as speakers, etc. The test case servlet 20 may also process requests to test the stress and stability of the system. An operator at the test builder 12 would determine what test case servlets 20 to spawn to perform testing operations on the appliances 8.

Appliance Specific Testing: After determining that all system and processing operations are functioning, the test case servlet 20 can then test the electrical and electromechanical components of the appliance, i.e., motors, lights, and any other operational aspect of the appliance that can be controlled by the embedded control system. For those operations of the system that are not accessible from the test case servlet 20, information may be provided to a user to perform specific operations that can be monitored from the test case servlet 20.

Preferred embodiments provide a servlet based architecture for testing pervasive appliances that have limited processing and memory capabilities. Preferred embodiments provide an integrated system from the step of generating the test request to enabling the appliance to process the test request. With the preferred embodiments, the test server 6 may have sufficient computing capabilities to process numerous test engine servlets 16 at a time to simultaneously handle multiple requests from different appliances. Further, preferred embodiments have the appliance load the test remotely so the appliance does not have to continuously store test servlets in the appliance's limited memory.

As pervasive appliances are upgraded to include embedded computing systems and network accessibility, diagnostic and testing operations may be offered from a remote test server site. This would avoid the need to provide costly repair services or inconvenience the customer in having to wait to obtain service. Instead, with the preferred embodiments, the customer may contact a service center. An operator at the service center could then immediately build a test request to test the customers appliance which would be processed immediately. In this way, the service center does not have to involve the customer in attempting to diagnose the problems. After diagnosing the system, the operator can then advise the optimal course of action, e.g., change the light bulb, alter a setting, send in for repair, schedule a visit with a service technician.

ALTERNATIVE EMBODIMENTS AND CONCLUSIONS

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described as implemented with HTTP server and Java servlet technology. However, in alternative embodiments other communication protocols and programming techniques may be used to implement the functions described with respect to the servlets and HTTP servers. In all embodiments, the appliance being tested would need an embedded system including processor and code to process requests from the test server.

The logic of FIGS. 2–5 provided specific operations to implement the test architecture. In further embodiments, steps described in the logic may be added, removed and/or modified and still fall within the scope of the present invention.

Preferred embodiments were described with respect to testing pervasive appliances. However, the preferred testing architecture may apply to any type of device including an embedded control system, especially devices having limited processing capabilities.

In preferred embodiments, the appliance is identified in a network using a URL address. However, in alternative embodiments any network addressing scheme may be used to define the location of the appliance in the network.

In further embodiments, the test server 6 and components therein may be implemented in a distributed computing environment on different machines. Alternatively, the test builder 4 and test server 6 may be integrated into a single machine.

In summary, the present invention provides a system, method, and program for testing appliances. The appliance includes an embedded processor system and an appliance network address to communicate with remote systems over a network. A first server program having a first network address receives a test request indicating a test to perform and an appliance to test. A second server program having a second network address is loaded and transmits information on the test request to the appliance network address indicated in the test request. A third server program having a third network address is loaded to execute within the appliance embedded processor in response to receiving information on the test request. The second server program transmits at least one test command to the third network address. The third server program executes each test command transmitted from the second server program and returns test response data, generated in response executing each test command, to the second network address for processing by the second server program.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for testing appliances, wherein the appliances include an embedded processor and an appliance network address to communicate with remote systems over a network, comprising:

receiving a test request at a first server program having a first network address indicating a test to perform and an appliance to test;

loading a second server program having a second network address;

transmitting, with the second server program, information on the test request to the appliance network address indicated in the test request;

loading a third server program to execute within the appliance embedded processor having a third network address in response to receiving information on the test request;

transmitting, with the second server program, at least one test command to the third network address;

executing, with the third server program, each test command transmitted from the second server program; and returning, with the third server program, test response data generated in response to executing each test command to the second network address for processing by the second server program.

2. The method of claim 1, further comprising:

receiving the information on the test request transmitted by the second server program with a fourth server program executing within the appliance embedded processor;

determining whether the third server program is loaded within the appliance embedded processor;

sending, with the fourth server program, a request for the third server program to the second network address if the third server program is not loaded on the appliance; and receiving the third server program from the second server program.

3. The method of claim 1, further comprising transmitting, with the second server program, a subsequent test command to the third network address after receiving returned test response data for a previous test command.

4. The method of claim 2, wherein the first server program is a Hypertext Transfer Protocol (HTTP) server, wherein the second server program is a servlet, wherein the third server program is a servlet, and wherein the fourth server program is an HTTP server.

5. The method of claim 1, further comprising:

transmitting a destroy command to the third network address; and removing, with the third server program, the third server program from the application embedded processor in response to processing the destroy command.

6. The method of claim 1, wherein the test request includes parameters to control the execution of the test command, wherein the parameters are transmitted with the test commands to the third server program.

7. The method of claim 1, wherein the execution of the test command determines computational resources available at the appliance, wherein the second server program further performs:

determining whether the returned test response data indicates that the appliance has sufficient computational resources to execute each test command; and returning failure if the appliance does not have sufficient computational resources.

8. The method of claim 1, further comprising:

generating the test request at a computer connected to the network;

transmitting, with the computer, the test request to the first server program at the first network address; and returning test response data, with the second server program, to the computer over the network.

9. A system for testing appliances, wherein the appliances include an embedded processor and an appliance network address to communicate with remote systems over a network, comprising:

first server program means, having a first network address, for receiving a test request indicating a test to perform and an appliance to test;

means for loading a second server program having a second network address;

second server program means for transmitting information on the test request to the appliance network address indicated in the test request and transmitting at least one test command to a third network address;

means for loading a third server program to execute within the appliance embedded processor having the third network address in response to receiving information on the test request; and third server program means for executing each test command transmitted from the second server program and for returning test response data generated in response to executing each test command to the second network address for processing by the second server program.

10. The system of claim 9, wherein the first server program means comprises an HTTP server program and the second and third program means comprise servlets.

11. The system of claim 9, further comprising fourth server program means, executing within the appliance embedded processor, for receiving the information on the test request transmitted by the second server program with a fourth server program; determining whether the third server program is loaded within the appliance embedded processor; sending a request for the third server program to the second network address if the third server program is not loaded on the appliance; and receiving the third server program from the second server program.

12. The system of claim 9, wherein the second server program means is further enabled to transmit a subsequent test command to the third network address after receiving test response data for a previous test command.

13. The system of claim 11, wherein the first server program means is a Hypertext Transfer Protocol (HTTP) server, wherein the second server program means is a servlet, wherein the third server program is a servlet means, and wherein the fourth server program means is an HTTP server.

14. The system of claim 9, further comprising means for transmitting a destroy command to the third network address and wherein the third server program removes the third server program from the application embedded processor in response to processing the destroy command.

15. The system of claim 9, wherein the test request includes parameters to control the execution of the test command, wherein the parameters are transmitted with the test commands to the third server program.

16. The system of claim 9, wherein the execution of the test command determines computational resources available at the appliance, wherein the second server program means further:

determines whether the returned test response data indicate that the appliance has sufficient computational resources to execute each test command; and returns failure if the appliance does not have sufficient computational resources.

17. The system of claim 9, further comprising:

a computer for generating the test request;

means for transmitting the test request from the computer to the first server program at the first network address, wherein the second server program means further returns test response data to the computer over the network.

18. An article of manufacture for testing appliances, wherein the appliances include an embedded processor and an appliance network address to communicate with remote systems over a network, the article of manufacture comprising computer usable media including at least one first server program, second server program, and third server program embedded therein that cause the appliance and at least one computer to perform:

receiving a test request with the first server program having a first network address indicating a test to perform and an appliance to test;

loading the second server program having a second network address;

transmitting, with the second server program, information on the test request to the appliance network address indicated in the test request;

loading the third server program to execute within the appliance embedded processor having a third network address in response to receiving information on the test request;

transmitting, with the second server program, at least one test command to the third network address;

executing, with the third server program, each test command transmitted from the second server program; and     returning, with the third server program, test response data generated in response to executing each test command to the second network address for processing by the second server program.

19. The article of manufacture of claim 18, wherein the computer usable media further includes a fourth server program executing within the appliance embedded processor, wherein the fourth server program causes the appliance embedded processor to perform:

receiving the information on the test request transmitted by the second server program;

determining whether the third server program is loaded within the appliance embedded processor;

sending a request for the third server program to the second network address if the third server program is not loaded on the appliance; and     receiving the third server program from the second server program.

20. The article of manufacture of claim 18, where in the second server program further causes one computer to perform transmitting a subsequent test command to the third network address after receiving test response data for a previous test command.

21. The article of manufacture of claim 19, wherein the first server program is a Hypertext Transfer Protocol (HTTP) server, wherein the second server program is a servlet, wherein the third server program is a servlet, and wherein the fourth server program is an HTTP server.

22. The article of manufacture of claim 18, further comprising:

transmitting a destroy command to the third network address; and     removing, with the third server program, the third server program from the application embedded processor in response to processing the destroy command.

23. The article of manufacture of claim 18, wherein the test request includes parameters to control the execution of the test command, wherein the parameters are transmitted with the test commands to the third server program.

24. The article of manufacture of claim 18, wherein the execution of the test command determines computational resources available at the appliance, wherein the second server program further causes the computer to perform:

determining whether the test response data indicates that the appliance has sufficient computational resources to execute each test command; and     returning failure if the appliance does not have sufficient computational resources.

25. The article of manufacture of claim 18, wherein the computer usable media further comprises a fourth program for causing a computer to perform:

generating the test request;

transmitting the test request to the first server program at the first network address, wherein the second server program returns the test response data to the computer over the network.

26. A method for testing appliances, wherein each appliance includes an embedded processor and an appliance network address to communicate with remote systems over a network, comprising:

storing a plurality of test cases on a test server remote from an appliance to be tested;

accessing one of the test cases based on an identity of the appliance to be tested;

downloading the test case to the appliance; and sending test response data generated during execution in the appliance of the downloaded portion of the test case to a system remote from the appliance.

27. The method of claim 26, wherein the test server and system are within the same computing device.

28. The method of claim 26, further comprising initiating downloading of one test case from a system separate from the appliance.

29. A system for testing appliances, wherein each appliance includes an embedded processor and an appliance network address to communicate with remote systems over a network, comprising:

means for storing a plurality of test cases on a test server remote from an appliance to be tested;

means for accessing one of the test cases based on an identity of the appliance to be tested;

means for downloading the test case to the appliance; and     means for sending test response data generated during execution in the appliance of the downloaded portion of the test case to a system remote from the appliance.

30. The system of claim 29, further comprising a computing device including the test server and the system.

31. The system of claim 29, further comprising means for initiating downloading of one test case from a system separate from the appliance.

32. An article of manufacture for testing appliances, wherein each appliance includes an embedded processor and an appliance network address to communicate with remote systems over a network, the article of manufacture comprising computer usable media including at least one computer program to perform:

storing a plurality of test cases on a test server remote from an appliance to be tested;

accessing one of the test cases based on an identity of the appliance to be tested;

downloading the test case to the appliance; and sending test response data generated during execution in the appliance of the downloaded portion of the test case to a system remote from the appliance.

33. The article of manufacture 32, wherein the test server and system are within the same computing device.

34. The article of manufacture 32, further comprising initiating downloading of one test case from a system separate from the appliance.

35. The method of claim 1, wherein the test request received at the first server program indicates the appliance network address corresponding to the appliance to be tested.

36. The method of claim 35, wherein the second server program receives the appliance network address from the first server program, and wherein the second server program transmits the test request to the appliance to be tested.

37. The system of claim 9, wherein the test request received by the first server program means indicates the appliance network address corresponding to the appliance to be tested.

38. The system of claim 37, wherein the second server program means receives the appliance network address from the first server program means, and wherein the second server program means transmits the test request to the appliance to be tested.

39. The article of manufacture of claim 18, wherein the test request received at the first server program indicates the appliance network address corresponding to the appliance to be tested.

40. The article of manufacture of claim 39, wherein the second server program receives the appliance network address from the first server program, and wherein the second server program transmits the test request to the appliance to be tested.

41. The method of claim 26, wherein at least one test case indicates an appliance network address corresponding to the appliance to be tested.

42. The system of claim 29, wherein at least one test case indicates an appliance network address corresponding to the appliance to be tested.

43. The article of manufacture of claim 32, wherein at least one test case indicates an appliance network address corresponding to the appliance to be tested.

* * * * *